United States Patent
Hu et al.

(10) Patent No.: US 9,665,226 B2
(45) Date of Patent: May 30, 2017

(54) TOUCH DISPLAY SUBSTRATE

(71) Applicants: Xiamen Tianma Micro-Electronics Co., Ltd., Xiamen (CN); Tianma Micro-Electronics Co., Ltd., Shenzhen (CN)

(72) Inventors: Shengpeng Hu, Xiamen (CN); Yizhi Yang, Xiamen (CN); Jiancai Huang, Xiamen (CN); Yumin Xu, Xiamen (CN)

(73) Assignees: XIAMEN TAINMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/757,675

(22) Filed: Dec. 22, 2015

(65) Prior Publication Data

US 2017/0003775 A1    Jan. 5, 2017

(30) Foreign Application Priority Data

Jun. 30, 2015    (CN) .......................... 2015 1 0374841

(51) Int. Cl.
*G06F 3/044*    (2006.01)
(52) U.S. Cl.
CPC .... *G06F 3/044* (2013.01); *G06F 2203/04103* (2013.01)

(58) Field of Classification Search
None
See application file for complete search history.

(56) References Cited

U.S. PATENT DOCUMENTS

| 9,285,910 B2 * | 3/2016 | Kim | G06F 3/0412 |
| 2015/0009174 A1 * | 1/2015 | Huang | G06F 3/044 345/174 |

* cited by examiner

*Primary Examiner* — Kenneth B Lee, Jr.
(74) *Attorney, Agent, or Firm* — Faegre Baker Daniels LLP

(57) ABSTRACT

A touch display substrate, including: a substrate including a display region and a non-display region; a plurality of common electrode blocks spaced apart from each other; a plurality of wirings; a vertical shift circuit including a plurality of cascaded vertical shift circuit units, and each of the plurality of vertical shift circuit units is connected with wirings corresponding to a column of common electrode blocks, and is configured to sequentially output touch driving signals to the column of common electrode blocks; and a controlling IC configured to output a touch driving signal to the vertical shift circuit; wherein, the plurality of common electrode blocks are divided into n groups of common electrode blocks by columns, and the controlling IC is configured to apply scan pulse signals with different frequencies to the groups of common electrode blocks in different touch scanning time periods.

10 Claims, 16 Drawing Sheets

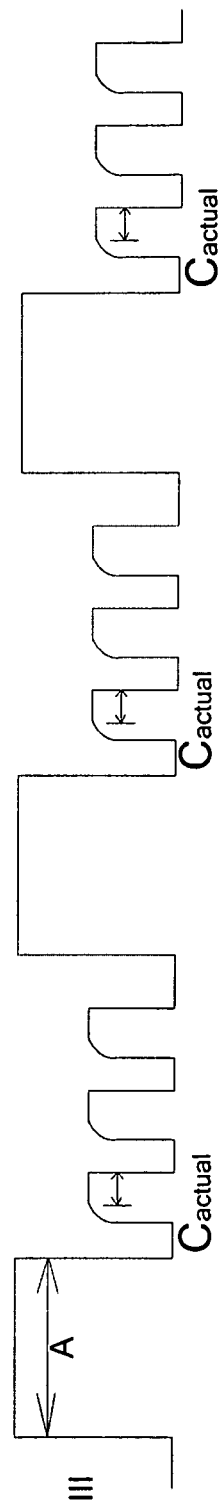

TOUCH DISPLAY SUBSTRATE

CROSS-REFERENCE TO RELATED APPLICATION

This application claims priority to Chinese Application No. 201510374841.3, filed Jun. 30, 2015, which is herein incorporated by reference in its entirety.

TECHNICAL FIELD

The present disclosure relates to the field of liquid crystal display technologies and, in particular, to a touch display substrate.

BACKGROUND

In an existing In-Cell touch display panel, a common electrode layer for a display function is generally divided into a plurality of common electrode blocks, which are electrically connected with a controlling Integrated Circuit (IC) via the respective wirings. The common electrode blocks are also operable as (i.e. reused as) touch electrodes, that is, in a display state, the common electrode blocks are configured to receive a common voltage signal, while in a touch sensing state, the common electrode blocks operate as touch driving electrodes for receiving touch driving signals.

Typically, the wirings connected with the common electrode blocks couple with other wirings of the touch display panel, thus generating therebetween parasitic capacitances, which increase as the length of the wirings increases. Therefore, the wirings corresponding to the common electrode blocks in proximity to the controlling IC cause relatively small parasitic capacitances, while the wirings corresponding to the common electrode blocks away from the controlling IC cause relatively large parasitic capacitances. Such differences of the parasitic capacitances result in differences between the desired preset time for touch sensing by the various common electrode blocks. However, the preset time for the touch sensing by the common electrode blocks is identical in the related art, so that the accuracy of the touch sensing by the various common electrode blocks is significantly decreased.

SUMMARY

In view of the above technical problems, embodiments of the disclosure provide a touch display substrate to solve the above technical problems.

Embodiments of the disclosure provide a touch display substrate, including:
- a substrate including a display region and a non-display region;
- a plurality of common electrode blocks spaced apart from each other, which are arranged in an M×N array with M rows and N columns, and are operable as touch electrodes, wherein M and N are positive integers;
- a plurality of wirings, each of which is electrically connected with a corresponding one of the plurality of common electrode blocks;
- a vertical shift circuit arranged in the non-display region and electrically connected with the plurality of wirings, wherein the vertical shift circuit includes a plurality of cascaded vertical shift circuit units, and each of the plurality of vertical shift circuit units is connected with wirings corresponding to a column of common electrode blocks, and is configured to sequentially output touch driving signals to the column of common electrode blocks; and
- a controlling IC connected with the vertical shift circuit and configured to output a touch driving signal to the vertical shift circuit;
- wherein, the plurality of common electrode blocks are divided into n groups of common electrode blocks by columns, and the controlling IC is configured to apply scan pulse signals with different frequencies to the groups of common electrode blocks in different touch scanning time periods.

In the touch display substrate, according to embodiments of the disclosure, the common electrode blocks are divided into n groups of common electrode blocks by columns, and the controlling IC is configured to apply scan pulse signals with different frequencies to the groups of common electrode blocks during different touch scanning time periods, to compensate the differences of loads caused by the different distances of the common electrode blocks to the controlling IC and reduce the differences of the parasitic capacitances, so that the difference in the preset time for the touch sensing by the common electrode blocks is reduced, thereby increasing the accuracy of the touch sensing by the common electrode blocks. Thus, the solution of the disclosure is especially suited for touch sensing by a large quantity of common electrode blocks.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions of the embodiments of the disclosure, the drawings used for the description of the embodiments are briefly introduced below. Obviously, the drawings for the following description only show some embodiments of the disclosure, and other drawings may also be obtained from the described drawings.

FIG. 5 is a diagram showing an actual waveform of a scan signal, according to embodiments of the disclosure.

Figure 1:
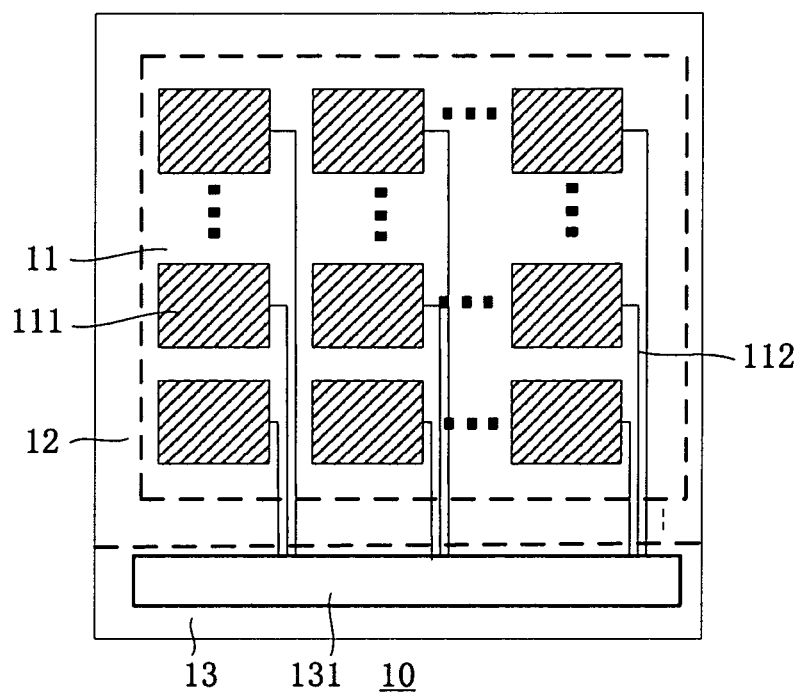
FIG. 1 is a schematic diagram showing a structure of a touch display substrate with a self-capacitance touch sensing function in the related art.

A list of reference numerals is as follows: 10—substrate; 11—display region; 12—peripheral frame region; 111—common electrode block; 112—wiring; 13—step region; 131—controlling IC; 14—non-display region; 21—vertical shift circuit unit.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further described in detail below in conjunction with the accompanying drawings and embodiments. It should be noted that the specific embodiments disclosed herein are intended for explaining, rather than limiting, the disclosure. It should also be noted that the accompanying drawings show only some parts relating to the disclosure, but not in an exhausting way, for the ease of description.

Before embodiments of the disclosure are described, a touch structure implementing the touch sensing function is briefly introduced. Currently, the touch structure implementing the touch sensing function is designed as a capacitive touch structure, in which one kind of electrodes (i.e. touch sensing electrodes) or two kinds of electrodes (such as touch driving electrodes and touch sensing electrodes) are provided to realize the touch sensing function by a self-capacitance formed between the one kind of electrodes and the ground or a mutual capacitance formed between the two kinds of electrodes. Since the technical solution of the disclosure is applicable to the capacitive touch structure, the capacitive touch structure will be mainly described in detail as follows.

In designing the capacitive touch structure provided with the two kinds of electrodes, i.e. the touch driving electrodes and the touch sensing electrodes, the touch driving electrodes and the touch sensing electrodes can be arranged in the same layer as desired, and accordingly, the touch driving electrodes and the touch sensing electrodes can be arranged in parallel and spaced apart from each other, or can intersect one another, where a bridge structure (i.e. a bypass structure) is employed at each intersection of the touch driving electrode and the touch sensing electrode. Alternatively, the touch driving electrodes and the touch sensing electrodes can be arranged in different layers as desired, and in this case, the touch driving electrodes are intersected with the touch sensing electrodes.

Herein, a self-capacitance touch sensing function is realized via a capacitance generated between the touch electrodes and the ground, while a mutual capacitance touch sensing function is realized via a capacitance generated between the touch driving electrodes and the touch sensing electrodes.

FIG. 1 is a schematic diagram showing a structure of a touch display substrate implementing the self-capacitance touch in the related art. As shown in FIG. 1, the touch display substrate is a substrate 10 for achieving a self-capacitance touch sensing function. The substrate 10 also operates for a display function and includes a display region 11, a peripheral frame region 12 surrounding the display region 11, and a step region 13 located at a side of the peripheral frame region 12. The display region 11 includes a plurality of common electrode blocks 111, each of which is electrically connected with a controlling IC 131 located at the step region 13 via a corresponding wiring 112. The controlling IC 131 is configured to transmit the same pulse signals to the plurality of common electrode blocks 111 to drive the common electrode blocks 111, thus the wirings corresponding to the common electrode block 111 in proximity to the controlling IC cause relatively small parasitic capacitances, while the wirings corresponding to the common electrode block 111 away from the controlling IC cause relatively large parasitic capacitances, so that the signal received by the common electrode block 111 away from the controlling IC is delayed as compared with the signal received by the common electrode block 111 in proximity to the controlling IC, thereby affecting the touch sensing effect and the display effect.

As a result, in view of the above introduction to the capacitive touch structure and the problems existing in the related art, embodiments of the disclosure give technical solutions as follows.

Figure 2:
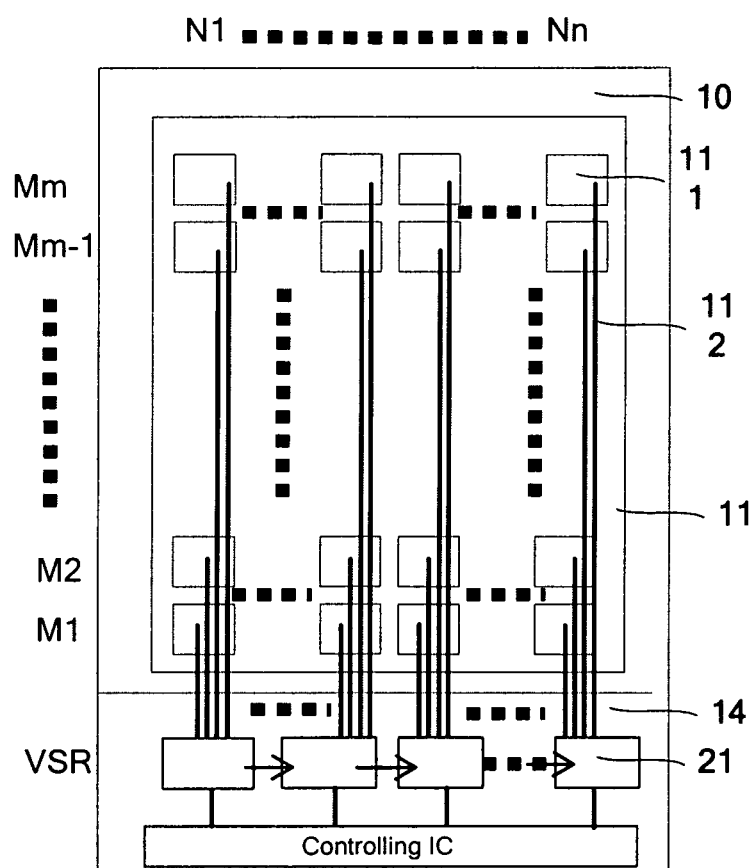
FIG. 2 is a schematic diagram showing a structure of a touch display substrate, according to embodiments of the disclosure.

Embodiments of the disclosure provide a touch display substrate. FIG. 2 is a schematic diagram showing a structure of the touch display substrate, according to embodiments of the disclosure.

As shown in FIG. 2, the touch display substrate includes:

a substrate 10 including a display region 11 and a non-display region 14;

a plurality of common electrode blocks 111 spaced apart from each other, which are arranged in an M×N array with M rows and N columns, and are operable as touch electrodes, where M and N are positive integers;

a plurality of wirings 112, each of which is electrically connected with a corresponding one of the plurality of common electrode blocks 111;

a vertical shift circuit (VSR) arranged in the non-display region 14 and electrically connected with the plurality of wirings 112, where the vertical shift circuit includes a plurality of cascaded vertical shift circuit units 21, and each of the plurality of the vertical shift circuit units 21 is connected with wirings 112 corresponding to a column of the common electrode blocks 111, and is configured to sequentially output touch driving signals to the corresponding column of the common electrode blocks 111; and a controlling IC connected with the vertical shift circuit and configured to output a touch driving signal to the vertical shift circuit;

where, the plurality of common electrode blocks 111 are divided into n groups of common electrode blocks by columns (i.e. n columns of common electrode blocks), and the controlling IC is configured to apply scan pulse signals with different frequencies to the groups of common electrode blocks in different touch scanning time periods.

In embodiments, the vertical shift circuit is disposed at the non-display region 14 of the substrate 10.

It should be noted that the controlling IC includes a display driving circuit configured to output display signals and a touch driving circuit configured to output touch driving signals, which are both arranged at the non-display region 14 of the substrate 10. The wirings 112 include display signal lines for transmitting the display signals from the display driving circuit and touch signal lines for transmitting the touch driving signals from the touch driving circuit.

In embodiments, the touch driving circuit can be a touch driving control circuit or a component containing a touch driving control circuit in a display panel. The touch driving circuit is also electrically connected with a touch integrated chip disposed in a Flexible Printed Circuit (FPC), where the touch integrated chip is configured to control the time when the touch driving circuit generates a touch driving signal, a duration of the generated touch driving signal, and a waveform of the generated touch driving signal. In addition, the touch integrated chip is also electrically connected with touch sensing electrodes to receive and process a generated touch sensing signal.

In a display state of the touch display substrate, a common voltage signal is applied to the touch electrodes. When a touch occurs, the display state is ended and a touch sensing state starts, that is, the display state and the touch sensing state operate in a time-division manner. In the touch sensing state, a touch driving signal is applied to the touch electrodes to realize the touch sensing function thereof. With such driving in the time-division manner, the display function and the touch sensing function of the touch display substrate are achieved.

Figure 3:
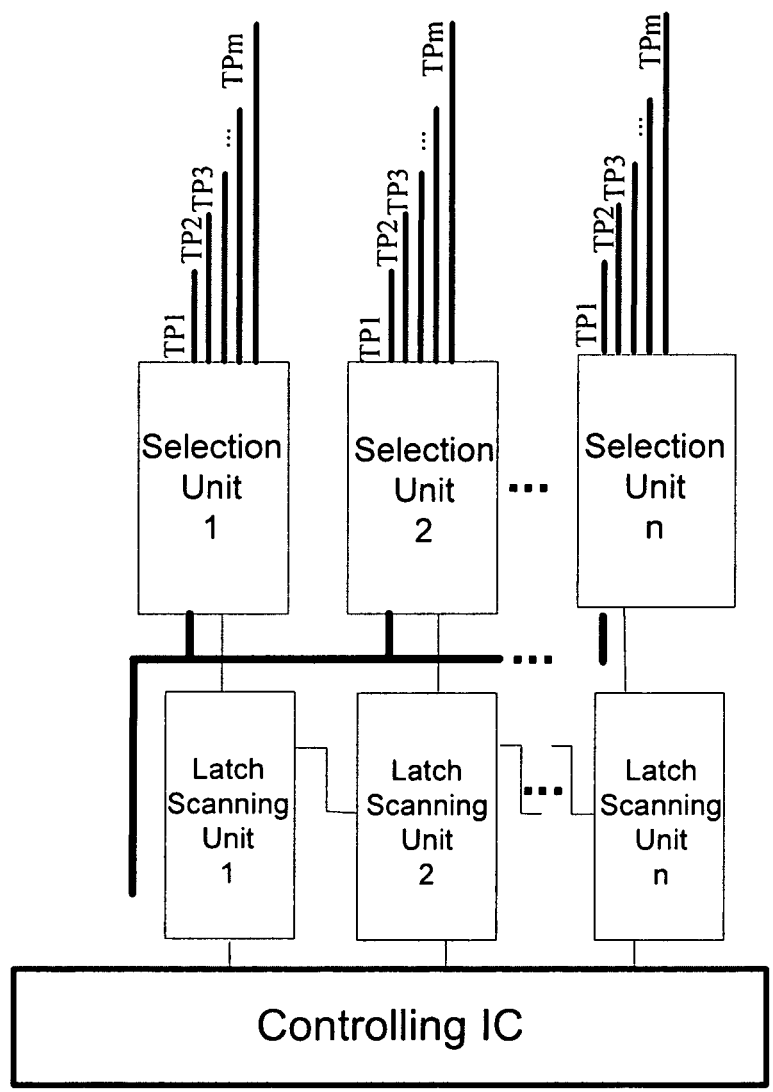
FIG. 3 is a block diagram showing a working principle of the touch display substrate, according to embodiments of the disclosure.

FIG. 3 is a block diagram showing the working principle of the touch display substrate, according to embodiments of the disclosure.

As shown in FIG. 3, the vertical shift circuit includes a plurality of cascaded vertical shift circuit units, each of which is connected with wirings corresponding to one column of common electrode blocks, and configured to sequentially transmit touch driving signals to the corresponding column of common electrode blocks. The vertical shift circuit unit includes a latch scanning circuit and a selection circuit, where the latch scanning circuit includes a plurality of latch scanning units, and the selection circuit includes a plurality of selection units.

Figure 4A:
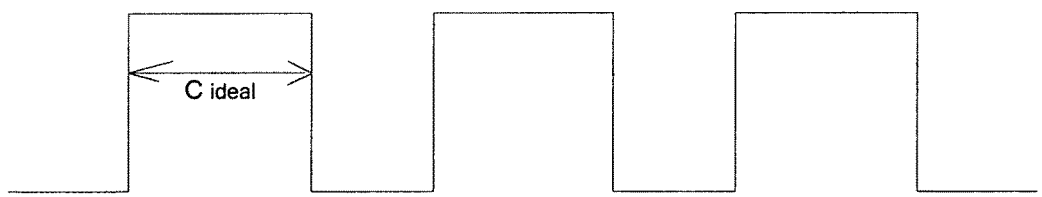
FIG. 4A is a diagram showing an ideal waveform of a scan pulse signal for a touch sensing state, according to embodiments of the disclosure.

FIG. 4A is a diagram showing an ideal waveform of a scan pulse signal in the touch sensing state, according to embodiments of the disclosure.

Figure 4B:
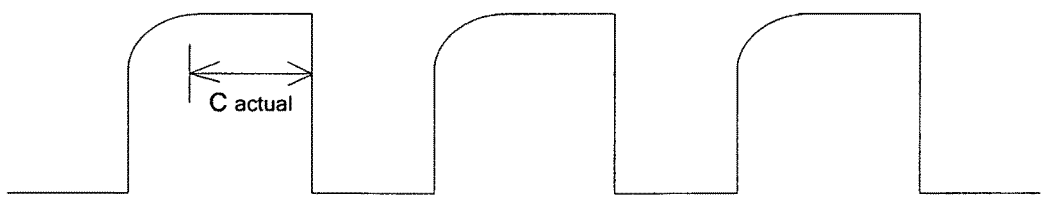
FIG. 4B is a diagram showing an actual waveform of a scan pulse signal for a touch sensing state, according to embodiments of the disclosure.

FIG. 4B is a diagram showing an actual waveform of a scan pulse signal in the touch sensing state, according to embodiments of the disclosure.

As shown in FIG. 4A, the ideal waveform of the scan pulse signal in the touch sensing state is a square waveform with an effective pulse width $C_{ideal}$. Due to the parasitic capacitance generated by the coupling between the touch signal lines connected with the touch electrodes and other wirings, an actual waveform of the scan pulse signal in the touching sensing state, which is shown in FIG. 4B, is different from the ideal waveform of the scan pulse signal, and the effective pulse width $C_{actual}$ of the actual waveform of the scan pulse signal is less than the effective pulse width $C_{ideal}$ of the ideal waveform of the scan pulse signal.

FIG. 5 is a diagram showing an actual waveform of a scan signal, according to embodiments of the disclosure.

As shown in FIG. 5, when a common voltage signal for the display state and a touch driving signal for the touch sensing state are applied in a time-division manner, because $C_{actual}$ is less than $C_{ideal}$ and hence the length of the pulse of the scan pulse signal for the touch sensing state is increased, the length of the pulse of the scan pulse signal for the display state is in turn shortened. As shown in FIG. 5, since the width of a region A (i.e. a display phase) is reduced, the common electrode blocks cannot be sufficiently charged during the region A, thus a picture cannot be displayed properly by the touch display substrate, thereby significantly degrading the quality of the displayed picture.

In embodiments, common electrode blocks of the touch display substrate are divided into n groups of common electrode blocks by columns, and the controlling IC is configured to apply scan pulse signals with different frequencies to the groups of common electrode blocks during different touch scanning time periods, to compensate the differences of loads caused by the different distances of the common electrode blocks to the controlling IC and reduce the differences of the parasitic capacitances, so that the difference in the preset time for the touch sensing by the common electrode blocks is reduced, thereby increasing the accuracy of the touch sensing by the common electrode blocks. Thus, the solution of the disclosure is especially suitable for touch sensing by a large quantity of common electrode blocks.

Figure 6:
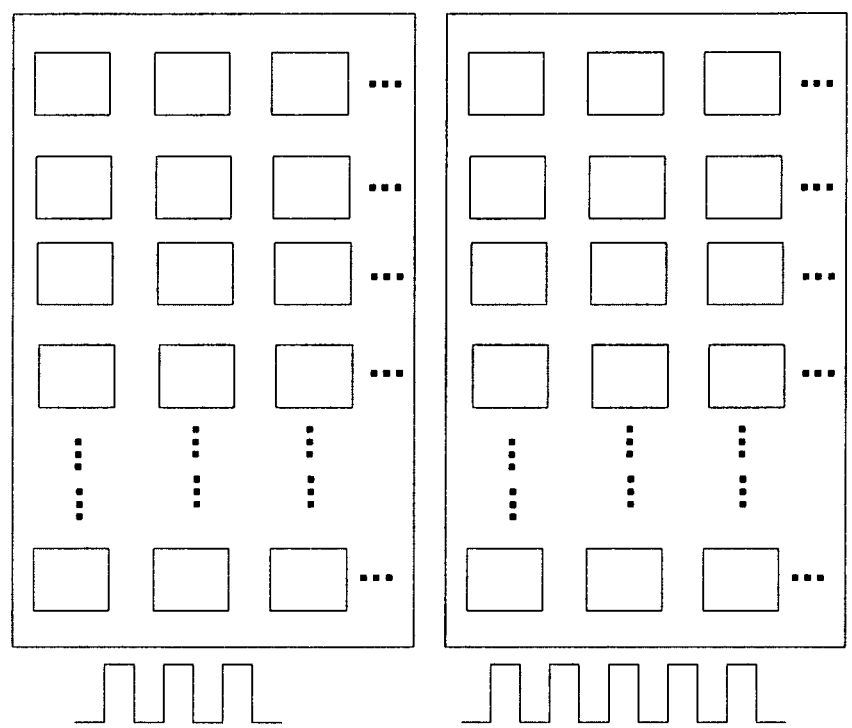
FIG. 6 is a diagram showing a first state in which different groups of common electrode blocks are respectively applied with scan pulse signals with different frequencies, according to embodiments of the disclosure.
Figure 7:
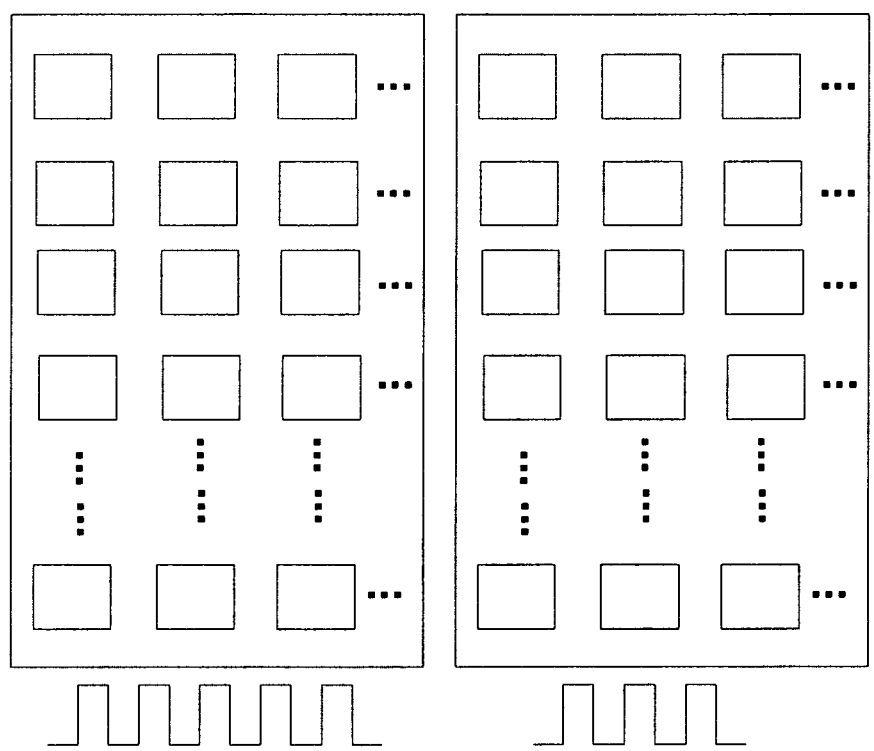
FIG. 7 is a diagram showing a second state in which different groups of common electrode blocks are respectively applied with scan pulse signals with different frequencies, according to embodiments of the disclosure.

Embodiments of the disclosure provide a touch display substrate. In embodiments, the common electrode blocks of the touch display substrate are divided into two equal groups of common electrode blocks by columns, and the controlling IC is configured to apply scan pulse signals with different frequencies to the two groups of common electrode blocks in different touch scanning time periods. FIGS. 6 and 7 are diagrams respectively showing a first state and a second state in which different groups of common electrode blocks are respectively applied with scan pulse signals with different frequencies according to embodiments of the disclosure.

As shown in FIGS. 6 and 7, based on the above embodiments, the common electrode blocks are divided into two equal groups of common electrode blocks by columns.

The controlling IC is configured to apply scan pulse signals with a first frequency to a first group of common electrode blocks and apply scan pulse signals with a second frequency to a second group of common electrode blocks in a first touch scanning time period, and apply scan pulse signals with the second frequency to the first group of common electrode blocks and apply scan pulse signals with the first frequency to the second group of common electrode blocks in a second touch scanning time period.

The first touch scanning time period alternates with the second touch scanning time period by a preset cycle.

For example, the first frequency is 500 KHz, and the second frequency is 800 KHz. As shown in FIGS. 6 and 7, the first group of common electrode blocks are represented by the group of common electrode blocks at the left side in FIGS. 6 and 7, and the second group of common electrode blocks is represented by the group of common electrode blocks at the right side in FIGS. 6 and 7. In the first touch scanning time period corresponding to the first state, the group of common electrode blocks at the left side are scanned column by column by the scan pulse signals with a first scanning frequency of 500 KHz, and after that, in the second touch scanning time period corresponding to the second state, the group of common electrode blocks at the left side are scanned column by column by the scan pulse signals with a second scanning frequency of 800 KHz, as such, the scanning for all the common electrode blocks at the left side is completed. While the group of common electrode blocks at the left side are being scanned, the group of common electrode blocks at the right side are scanned simultaneously, that is, in the first touch scanning time period corresponding to the first state, the group of common electrode blocks at the right side are scanned column by column by the scan pulse signals with the second scanning frequency of 800 KHz, and after that, in the second touch scanning time period corresponding to the second state, the group of common electrode blocks at the right side are scanned column by column by the scan pulse signals with the first scanning frequency of 500 KHz, as such, the scanning for all the common electrode blocks at the right side is completed. The preset cycle refers to the time for scanning any one of the groups of common electrode blocks. The scanning period for each frame is 16.7 seconds, and hence the preset cycle is 8.35 seconds in this case.

Figure 8:
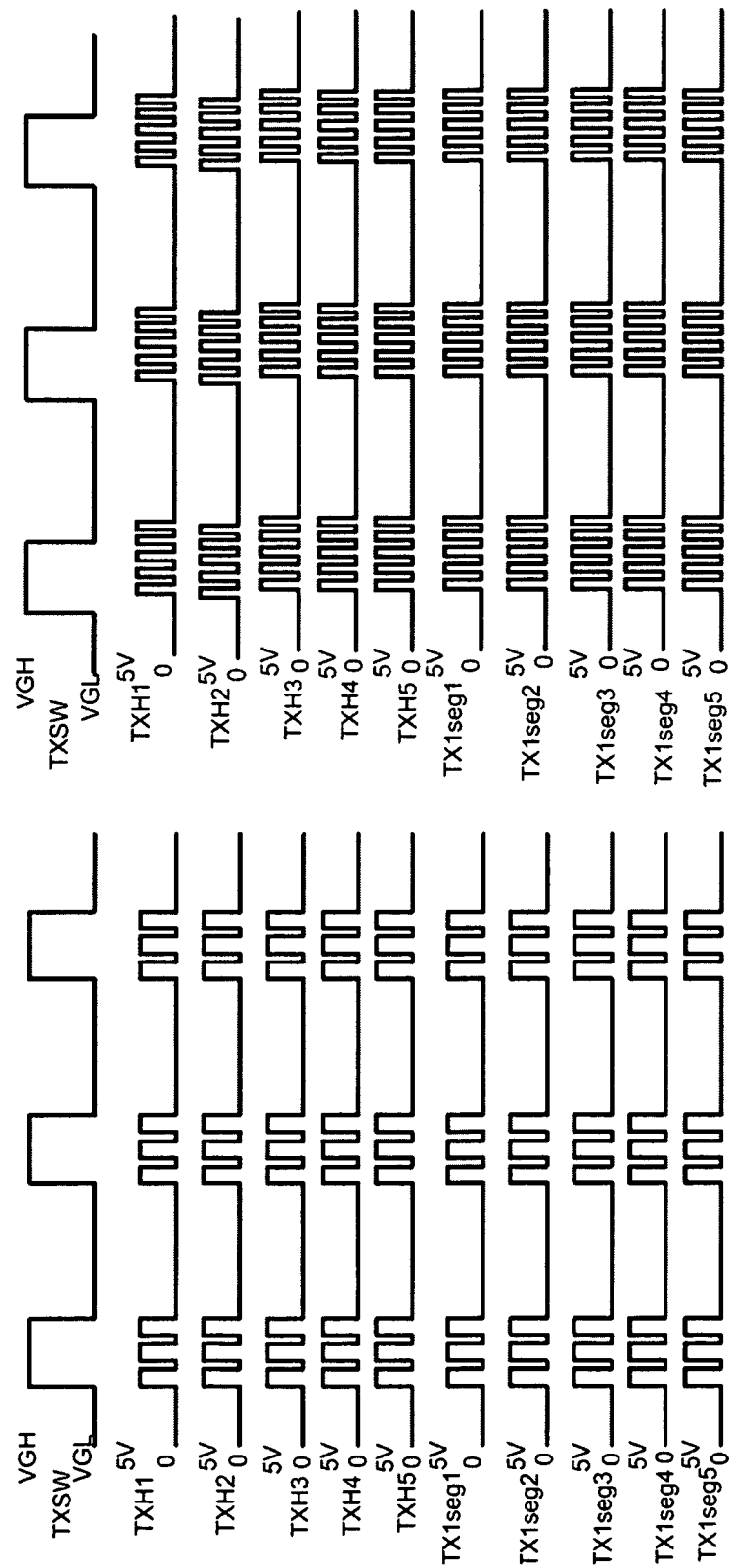
FIG. 8 is a diagram showing waveforms of scan pulse signals with different frequencies applied to different groups of common electrode blocks, according to embodiments of the disclosure.

FIG. 8 is a diagram showing waveforms of scan pulse signals with different frequencies applied to different groups of common electrode blocks according to embodiments of the disclosure. As shown in FIG. 8 which corresponds to the first state and the first touch scanning time period, the waveforms at the left side in FIG. 8 illustrate the scanning frequency of the scan pulse signals applied to the group of common electrode blocks at the left side in FIG. 6, and the waveforms at the right side in FIG. 8 illustrate the scanning frequency of the scan pulse signals applied to the group of common electrode blocks at the right side in FIG. 6. Although scan pulse signals applied to only five common electrode blocks are shown in FIG. 8 as an example for description, the common electrode blocks included in the touch display substrate are arranged in an M×N array, that is, there are M×N common electrode blocks.

In embodiments, the common electrode blocks of the touch display substrate are divided into two equal groups of common electrode blocks by columns, and the controlling IC is configured to apply scan pulse signals with different frequencies to the first and second groups of common electrode blocks during different touch scanning time periods, respectively. The alternating outputs of the scan pulse signals with a high frequency and the scan pulse signals with a low frequency can compensate the differences of loads caused by the different distances of the common electrode blocks to the controlling IC and reduce the differences of the parasitic capacitances, so that the difference in the preset time for the touch sensing by the common electrode blocks is reduced, thereby increasing the accuracy of the touch sensing by the common electrode blocks. Thus, the solution of the disclosure is especially suitable for touch sensing by a large quantity of common electrode blocks.

Figure 9:
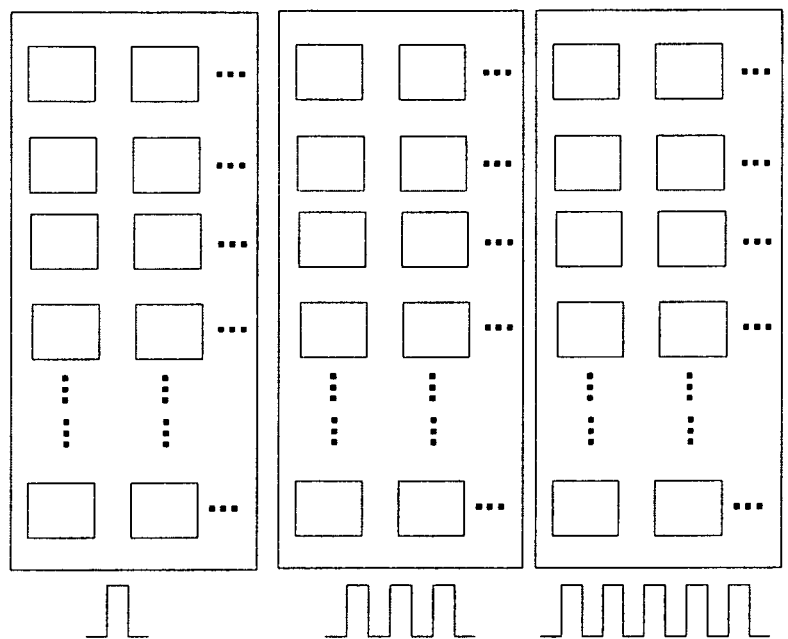
FIG. 9 is a diagram showing a first state in which different groups of common electrode blocks are respectively applied with scan pulse signals with different frequencies, according to embodiments of the disclosure.
Figure 10:
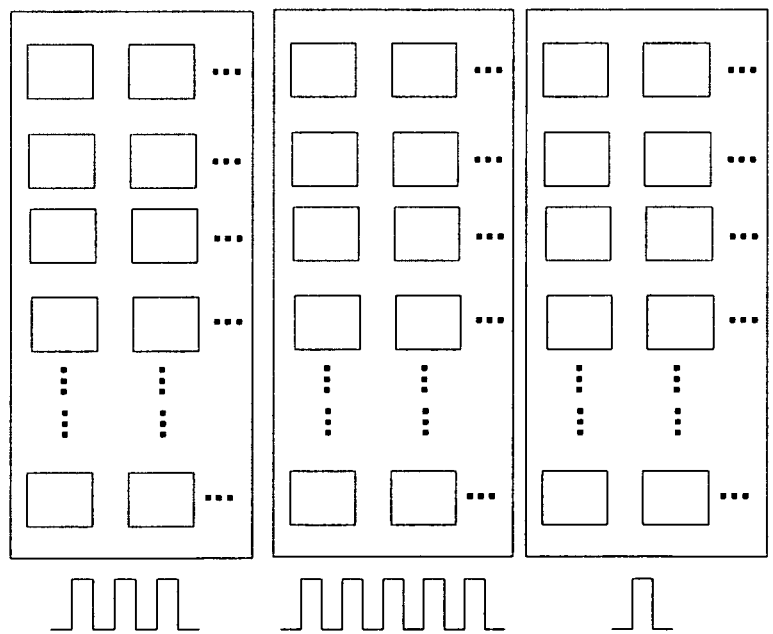
FIG. 10 is a diagram showing a second state in which different groups of common electrode blocks are respectively applied with scan pulse signals with different frequencies, according to embodiments of the disclosure.
Figure 11:
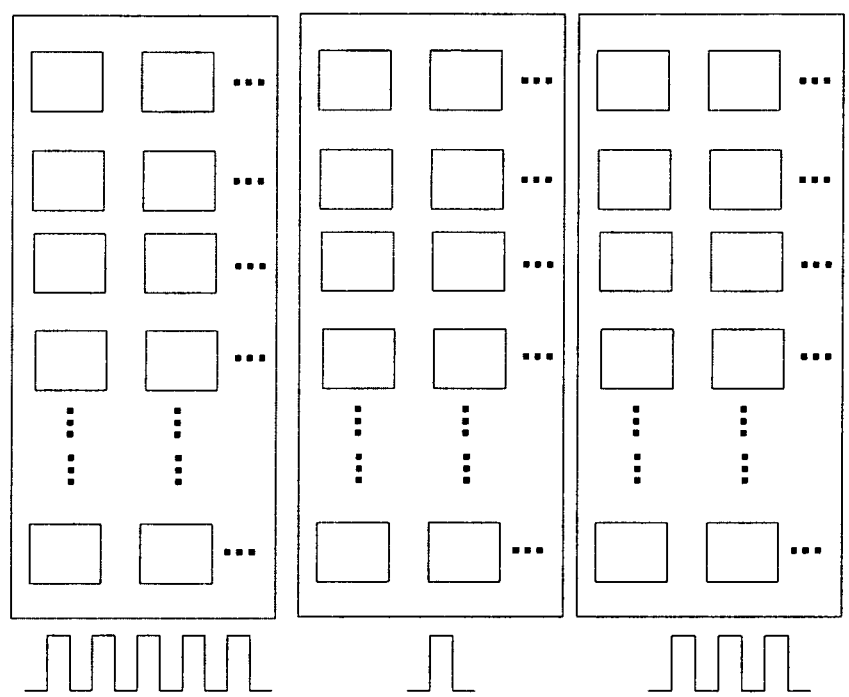
FIG. 11 is a diagram showing a third state in which different groups of common electrode blocks are respectively applied with scan pulse signals with different frequencies, according to embodiments of the disclosure.

Embodiments of the disclosure provide a touch display substrate. In embodiments, the common electrode blocks of the touch display substrate are divided into three equal groups of common electrode blocks by columns, and the controlling IC is configured to apply scan pulse signals with different frequencies to these three groups of common electrode blocks during different touch scanning time periods. FIGS. 9, 10 and 11 are diagrams respectively showing a first state, a second state and a third state in which different groups of common electrode blocks are applied with scan pulse signals with different frequencies, according to embodiments of the disclosure.

As shown in FIGS. 9, 10 and 11, based on above embodiments, the common electrode blocks are divided into three equal groups of common electrode blocks by columns.

The controlling IC is configured to apply scan pulse signals with a first frequency to a first group of common electrode blocks, apply scan pulse signals with a second frequency to a second group of common electrode blocks and apply scan pulse signals with a third frequency to a third group of common electrode blocks in a first touch scanning time period; apply scan pulse signals with the second frequency to the first group of common electrode blocks, apply scan pulse signals with the third frequency to the second group of common electrode blocks, and apply scan pulse signal with the first frequency to the third group of common electrode blocks in a second touch scanning time period; and apply scan pulse signals with the third frequency to the first group of common electrode blocks, apply scan pulse signals with the first frequency to the second group of common electrode blocks, and apply scan pulse signal with the second frequency to the third group of common electrode blocks in a third touch scanning time period.

The first touch scanning time period, the second touch scanning time period and the third touch scanning time period alternate with one another by a preset cycle.

For example, the first frequency is 300 KHz, the second frequency is 500 KHz and the third frequency is 800 KHz. As shown in FIGS. 9, 10 and 11, the first group of common electrode blocks are represented by the group of common electrode blocks at the left side in FIGS. 9, 10 and 11, the second group of common electrode blocks are represented by the group of common electrode blocks in the middle of FIGS. 9, 10 and 11, and the third group of common electrode blocks are represented by the group of common electrode blocks at the right side in FIGS. 9, 10 and 11. In the first touch scanning time period corresponding to the first state, the group of common electrode blocks at the left side are scanned column by column by the scan pulse signals with a first scanning frequency of 300 KHz, after that, in the second touch scanning time period corresponding to the second state, the group of common electrode blocks at the left side are scanned column by column by the scan pulse signals with a second scanning frequency of 500 KHz, and after that, in the third touch scanning time period corresponding to the third state, the group of common electrode blocks at the left side are scanned column by column by the scan pulse signals with a third scanning frequency of 800 KHz, as such, the scanning for all the common electrode blocks at the left side is completed. While the group of common electrode blocks at the left side are being scanned, the group of common electrode blocks in the middle are also simultaneously scanned, that is, in the first touch scanning time period corresponding to the first state, the group of common electrode blocks in the middle are scanned column by column by the scan pulse signals with the second scanning frequency of 500 KHz, after that, in the second touch scanning time period corresponding to the second state, the group of common electrode blocks in the middle are scanned column by column by the scan pulse signals with the third scanning frequency of 800 KHz, and after that, in the third touch scanning time period corresponding to the third state, the group of common electrode blocks in the middle are scanned column by column by the scan pulse signals with the first scanning frequency of 300 KHz, as such, the scanning for all the common electrode blocks in the middle is completed. While the group of common electrode blocks in the middle are being scanned, the group of common electrode blocks at the right side are also simultaneously scanned, that is, in the first touch scanning time period corresponding to the first state, the group of common electrode blocks at the right side are scanned column by column by the scan pulse signals with the third scanning frequency of 800 KHz, after that, in the second touch scanning time period corresponding to the second state, the group of common electrode blocks at the right side are scanned column by column by the scan pulse signals with the first scanning frequency of 300 KHz, and after that, in the third touch scanning time period corresponding to the third state, the group of common electrode blocks at the right side are scanned column by column by the scan pulse signals with the second scanning frequency of 500 KHz, as such, the scanning for all the common electrode blocks at the right side is completed. The preset cycle refers to the time for scanning any one of the groups of common electrode blocks. The scanning period for each frame is 16.7 s, and hence the preset cycle is 5.56 s in this case.

In embodiments, the common electrode blocks of the touch display substrate are divided into three equal groups of common electrode blocks by columns, and the controlling IC is configured to apply scan pulse signals with different frequencies to the first, second and third groups of common electrode blocks during different touch scanning time periods, respectively. The alternating outputs of the scan pulse signals with the low frequency, the scan pulse signals with the middle frequency and the scan pulse signals with the high frequency can compensate the differences of loads caused by the different distances of the common electrode blocks to the controlling IC and reduce the differences of the parasitic capacitances, so that the difference in the preset time for the touch sensing by the common electrode blocks is reduced, thereby increasing the accuracy of the touch sensing by the common electrode blocks. Thus, the solution of the present disclosure is especially suitable for touch sensing by a large quantity of common electrode blocks.

Figure 12:
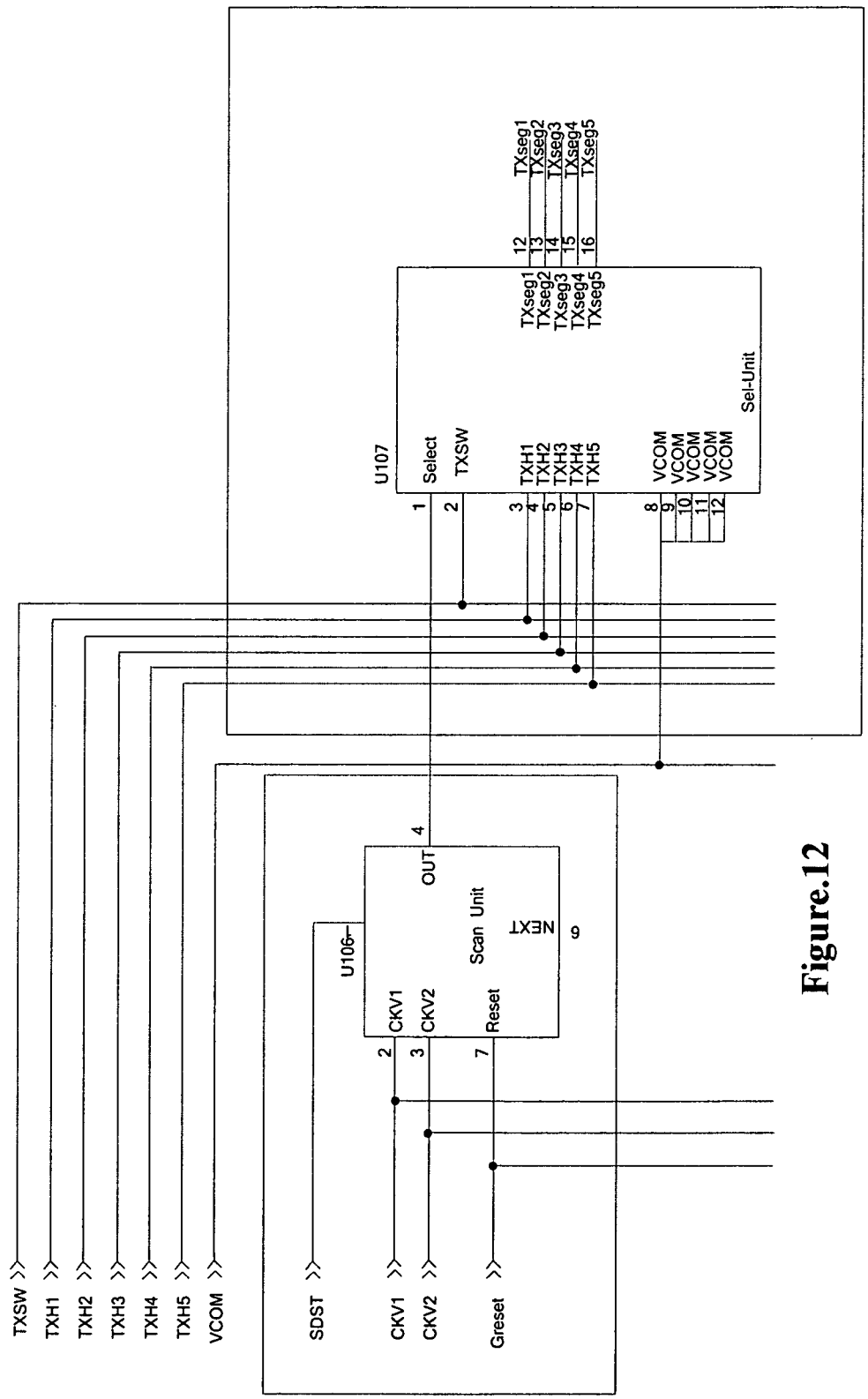
FIG. 12 is a block diagram showing the structure of a vertical shift circuit, according to embodiments of the disclosure.

Embodiments of the disclosure provide a touch display substrate. FIG. 12 is a block diagram showing the structure of a vertical shift circuit, according to embodiments of the disclosure.

As shown in FIG. 12, based on above embodiments, the vertical shift circuit unit includes a latch scanning circuit (such as the Scan Unit shown in FIG. 12) and a selection circuit (such as the Sel-Unit shown in FIG. 12), control terminals SDST, CKV1, CKV2 of the latch scanning circuit are connected with the controlling IC, a first output terminal OUT of the latch scanning circuit is connected with a selection signal inputting terminal Select of the selection circuit, and a second output terminal NEXT of the latch scanning circuit is connected with a control terminal of a next stage of latch scanning circuit.

Signal outputting terminals TXclk1, TXclk2 of the selection circuit are connected with the common electrode blocks. The selection circuit further includes touch signal terminals TX1, TX2, TX3 configured to receive touch driving signals and a common electrode signal terminal Vcom configured to receive a common electrode signal.

Figure 13:
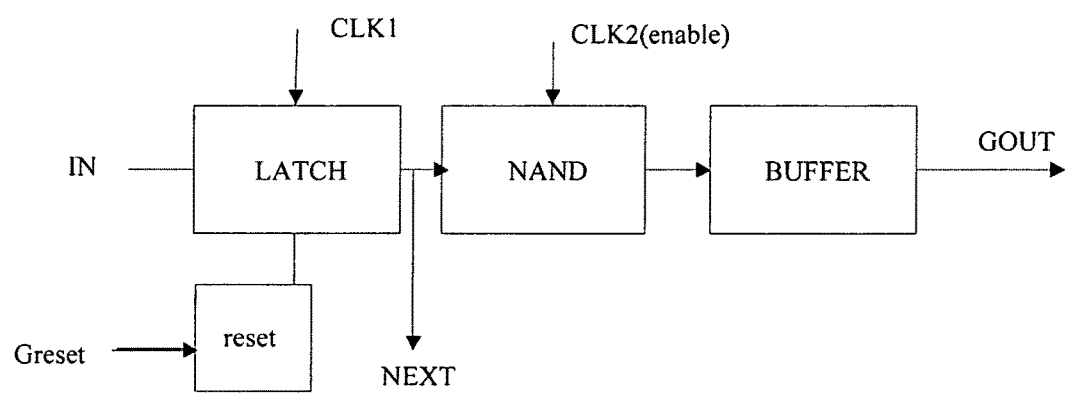
FIG. 13 is a block diagram showing the structure of a latch scanning circuit, according to embodiments of the disclosure.

FIG. 13 is a block diagram showing the structure of the latch scanning circuit, according to embodiments of the disclosure. As shown in FIG. 13, the latch scanning circuit includes a latch, a NAND gate, a buffer and a reset switch. A first input terminal IN of the latch is connected with the controlling IC, an output terminal of the latch is connected with the an input terminal of the NAND gate, an output terminal of the NAND gate is connected with an input terminal of the buffer, an output terminal of the buffer is connected with a selection signal inputting terminal of the selection circuit, and a second input terminal of the latch is connected with the reset switch.

The latch, which is a storage unit circuit sensitive to a pulse level, changes its state in response to a specific inputted pulse level, and latches a signal temporarily to maintain a certain level state.

Figure 14:
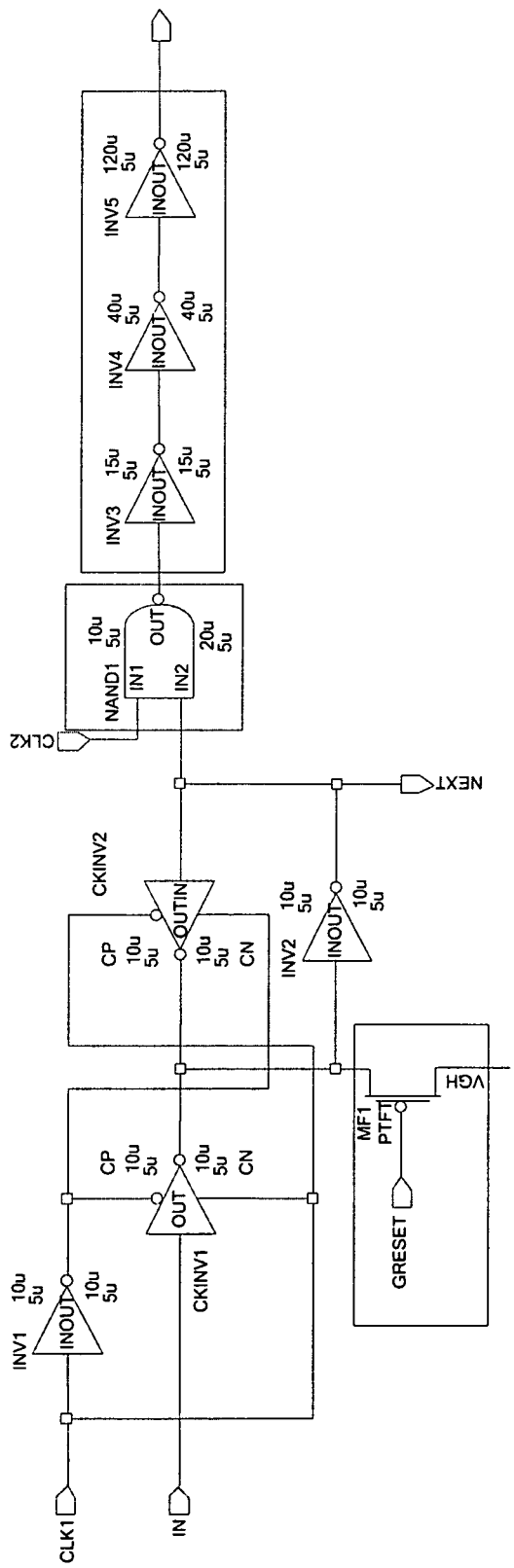
FIG. 14 is a circuit diagram of the latch scanning circuit, according to embodiments of the disclosure.

FIG. 14 is a circuit diagram of the latch scanning circuit, according to embodiments of the disclosure. As shown in FIG. 14, the latch scanning circuit includes a first inverter INV1, a second inverter INV2, a third inverter INV3, a fourth inverter INV4, a fifth inverter INV5, a first clock inverter CKINV1, a second clock inverter CKINV2, a NAND gate NANDI and a P-type thin film transistor MF1.

An input terminal of the first inverter is connected with the controlling IC, a second power terminal of the first clock inverter and a first power terminal of the second clock inverter; an input terminal of the first clock inverter is connected with the controlling IC; an output terminal of the first inverter is connected with a first power terminal of the first clock inverter and a second power terminal of the second clock inverter; an output terminal of the first clock inverter is connected with a drain electrode of the P-type thin film transistor, an output terminal of the second clock inverter and an input terminal of the second inverter; an output terminal of the second inverter is connected with an input terminal of the second clock inverter and a second input terminal of the NAND gate; a first input terminal of the NAND gate is connected with the controlling IC; an output terminal of the NAND gate is connected with an input terminal of the third inverter; an output terminal of the third inverter is connected with an input terminal of the fourth inverter; an output terminal of the fourth inverter is connected with an input terminal of the fifth inverter; an output terminal of the fifth inverter is connected with the selection signal inputting terminal of the selection circuit; a gate electrode of the P-type thin film transistor is connected with a reset signal terminal; and a source electrode of the P-type thin film transistor is connected with a voltage signal terminal.

Of course, there are many variants of the above circuit, and the corresponding functions of the circuits can be achieved by different connection manners and elements with different parameters in light of the disclosure, which will not be described in detail herein.

In embodiments, the touch display substrate includes the vertical shift circuit and the controlling IC, where the vertical shift circuit includes at least two cascaded vertical shift circuit units, each of which is respectively connected with one group of common electrode blocks and configured to output touch driving signals to the corresponding group of common electrode blocks. In other words, each group of common electrode blocks are electrically connected with one data interface of the controlling IC via merely one data interface of the corresponding vertical shift circuit unit, so that the number of the data interfaces between the groups of common electrode blocks and the controlling IC is reduced, and hence the manufacturing cost of the controlling IC and the touch display substrate is significantly decreased due to the reduced number of the data interfaces.

Figure 15:
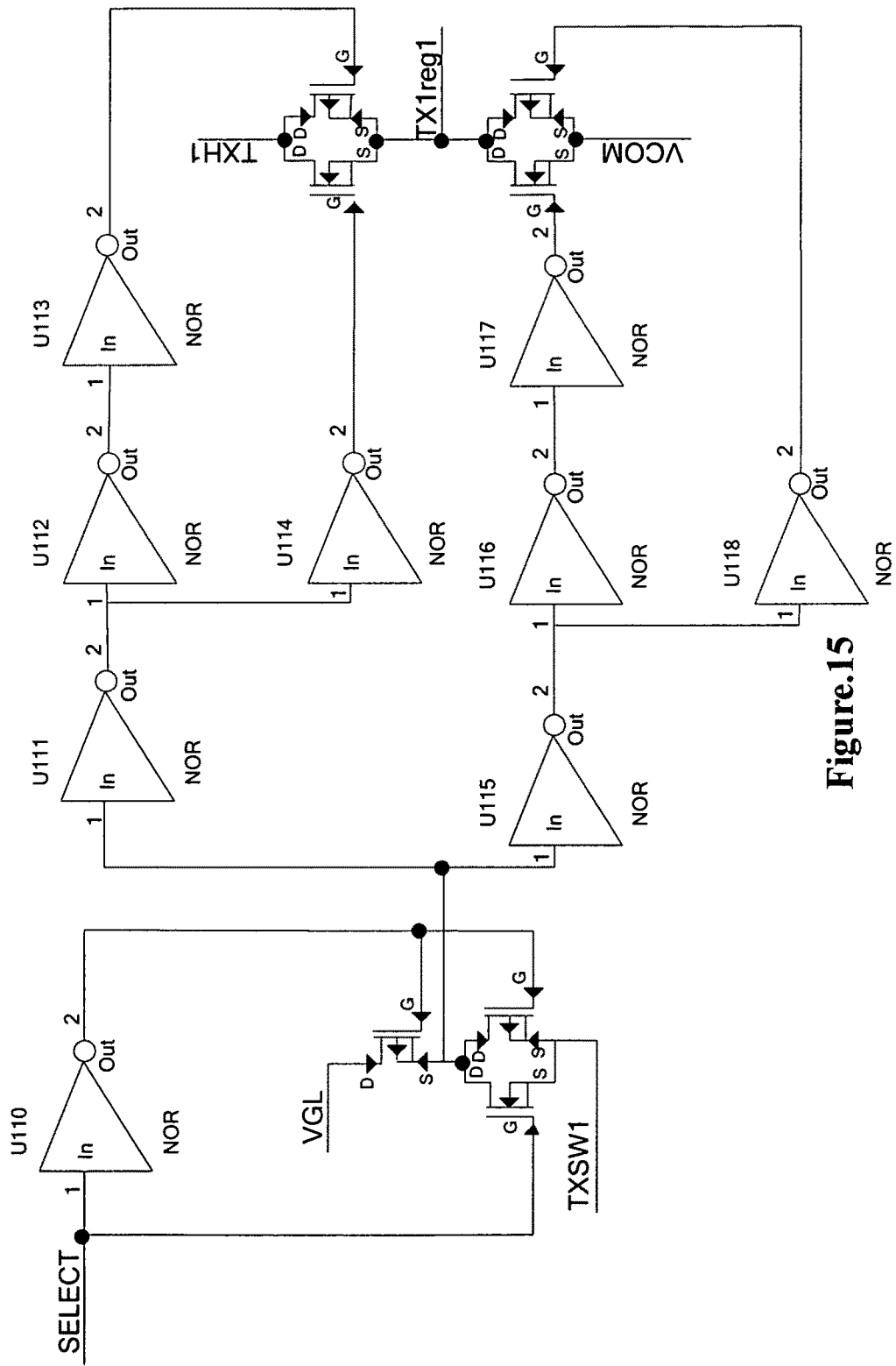
FIG. 15 is a first circuit diagram of a selection circuit, according to embodiments of the disclosure.

Embodiments of the disclosure provide a touch display substrate. FIG. 15 is a first circuit diagram of a selection circuit, according to embodiments of the disclosure.

As shown in FIG. 15, based on embodiments, a selection circuit includes a sixth inverter U110, a seventh inverter U111, an eighth inverter U112, a ninth inverter U113, a tenth inverter U114, an eleventh inverter U115, a twelfth inverter U116, a thirteenth inverter U117, a fourteenth inverter U118, an N-type thin film transistor, a first transmission gate and at least one group of transmission gates (e.g. including two transmission gates connected with the terminal TX1reg1 shown in FIG. 15), where the group of transmission gates includes a second transmission gate and a third transmission gate.

An input terminal of the sixth inverter is connected with a selection signal inputting terminal of the selection circuit and an input terminal of the first transmission gate; an output terminal of the sixth inverter is connected with a gate electrode of the N-type thin film transistor and an output terminal of the first transmission gate; a second power terminal of the first transmission gate is connected with a switch controlling signal terminal; a drain electrode of the N-type thin film transistor is connected with a voltage signal terminal; a first power terminal of the first transmission gate is connected with an input terminal of the seventh inverter, an input terminal of the eleventh inverter and a source electrode of the N-type thin film transistor; an output terminal of the seventh inverter is connected with an input terminal of the eighth inverter and an input terminal of the tenth inverter; an output terminal of the eighth inverter is connected with an input terminal of the ninth inverter; an output terminal of the tenth inverter is connected with an input terminal of the second transmission gate; an output terminal of the ninth inverter is connected with an output terminal of the second transmission gate; an output terminal of the eleventh inverter is connected with an input terminal of the twelfth inverter and an input terminal of the fourteenth inverter; an output terminal of the twelfth inverter is connected with an input terminal of the thirteenth inverter; an output terminal of the thirteenth inverter is connected with an input terminal of the third transmission gate included in the same group of transmission gates as the second transmission gate; an output terminal of the fourteenth inverter is connected with an output terminal of the third transmission gate; and a second power terminal of the second transmission gate is connected with a first power terminal of the third transmission gate.

It should be noted that in the case that the signal input terminals CKV1, CKV2 and the switch signal controlling terminal SDST are both at a high level, the signal of the terminal TXseg1 is represented by the signal of the terminal TXH1.

Figure 16:
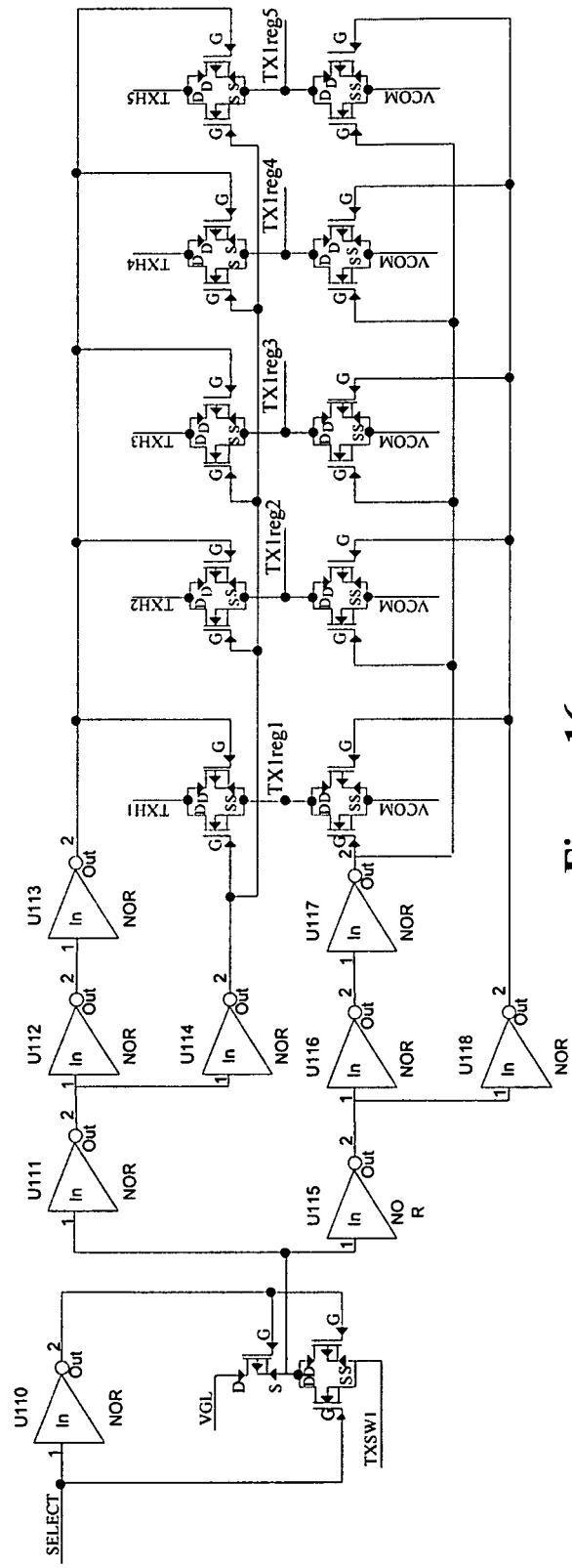
FIG. 16 is a second circuit diagram of the selection circuit, according to embodiments of the disclosure.

FIG. 16 is a second circuit diagram of the selection circuit, according to embodiments of the disclosure. Five groups of transmission gates are included in the selection circuit provided in the fifth embodiment, and each group of transmission gates includes two transmission gates. As shown in FIG. 16, the selection circuit includes a sixth inverter U110, a seventh inverter U111, an eighth inverter U112, a ninth inverter U113, a tenth inverter U114, an eleventh inverter U115, a twelfth inverter U116, a thirteenth inverter U117, a fourteenth inverter U118, an N-type thin film transistor, a first transmission gate, a fourth transmission gate (corresponding to one of two transmission gates connected with the terminal TX1reg1 shown in FIG. 16), a fifth transmission gate (corresponding to the other of the two transmission gates connected with the terminal TX1reg1 shown in FIG. 16), a sixth transmission gate (corresponding to one of two transmission gates connected with the terminal TX1reg2 shown in FIG. 16), a seventh transmission gate (corresponding to the other of the two transmission gates connected with the terminal TX1reg2 shown in FIG. 16), an eighth transmission gate (corresponding to one of two transmission gates connected with the terminal TX1reg3 shown in FIG. 16), a ninth transmission gate (corresponding to the other of the two transmission gates connected with the terminal TX1reg3 shown in FIG. 16), a tenth transmission gate (corresponding to one of two transmission gates connected with the terminal TX1reg4 shown in FIG. 16), an eleventh transmission gate (corresponding to the other of the two transmission gates connected with the terminal TX1reg4 shown in FIG. 16), and a twelfth transmission gate (corresponding to one of two transmission gates connected with the terminal TX1reg5 shown in FIG. 16) and a thirteenth transmission gate (corresponding to the other of the two transmission gates connected with the terminal TX1reg5 shown in FIG. 16).

An input terminal of the sixth inverter is connected with a selection signal inputting terminal of the selection circuit and an input terminal of the first transmission gate; an output terminal of the sixth inverter is connected with a gate electrode of the N-type thin film transistor and an output terminal of the first transmission gate; a second power terminal of the first transmission gate is connected with a switch controlling signal terminal; a drain electrode of the N-type thin film transistor is connected with a voltage signal terminal; a first power terminal of the first transmission gate is connected with an input terminal of the seventh inverter, an input terminal of the eleventh inverter and a source electrode of the N-type thin film transistor; an output terminal of the seventh inverter is connected with an input terminal of the eighth inverter and an input terminal of the tenth inverter; an output terminal of the eighth inverter is connected with an input terminal of the ninth inverter; an output terminal of the tenth inverter is connected with an input terminal of the fourth transmission gate; an input terminal of the sixth transmission gate, an input terminal of the eighth transmission gate, an input terminal of the tenth transmission gate and an input terminal of the twelfth inverter transmission gate; an output terminal of the ninth inverter is connected with an output terminal of the fourth transmission gate, an output terminal of the sixth transmission gate, an output terminal of the eighth transmission gate, an output terminal of the tenth transmission gate, and an output terminal of the twelfth transmission gate; an output terminal of the eleventh inverter is connected with an input terminal of the twelfth inverter and an input terminal of the fourteenth inverter; an output terminal of the twelfth inverter is connected with an input terminal of the thirteenth inverter; an output terminal of the thirteenth inverter is connected with an input terminal of the fifth transmission gate, an input terminal of the seventh transmission gate, an input terminal of the ninth transmission gate, an input terminal of the eleventh transmission gate and an input terminal of the thirteenth transmission gate; an output terminal of the fourteenth is connected with an output terminal of the fifth transmission gate, an output terminal of the seventh transmission gate, an output terminal of the ninth transmission gate, an output terminal of the eleventh transmission gate and an output terminal of the thirteenth transmission gate; a second power terminal of the fourth transmission gate is connected with a first power terminal of the fifth transmission gate; a second power terminal of the sixth transmission gate is connected with a first power terminal of the seventh transmission gate; a second power terminal of the eighth transmission gate is connected with a first power terminal of the ninth transmission gate, a second power terminal of the tenth transmission gate is connected with a first power terminal of the eleventh transmission gate; and a second power terminal of the twelfth transmission gate is connected with a first power terminal of the thirteenth transmission gate.

Figure 17:
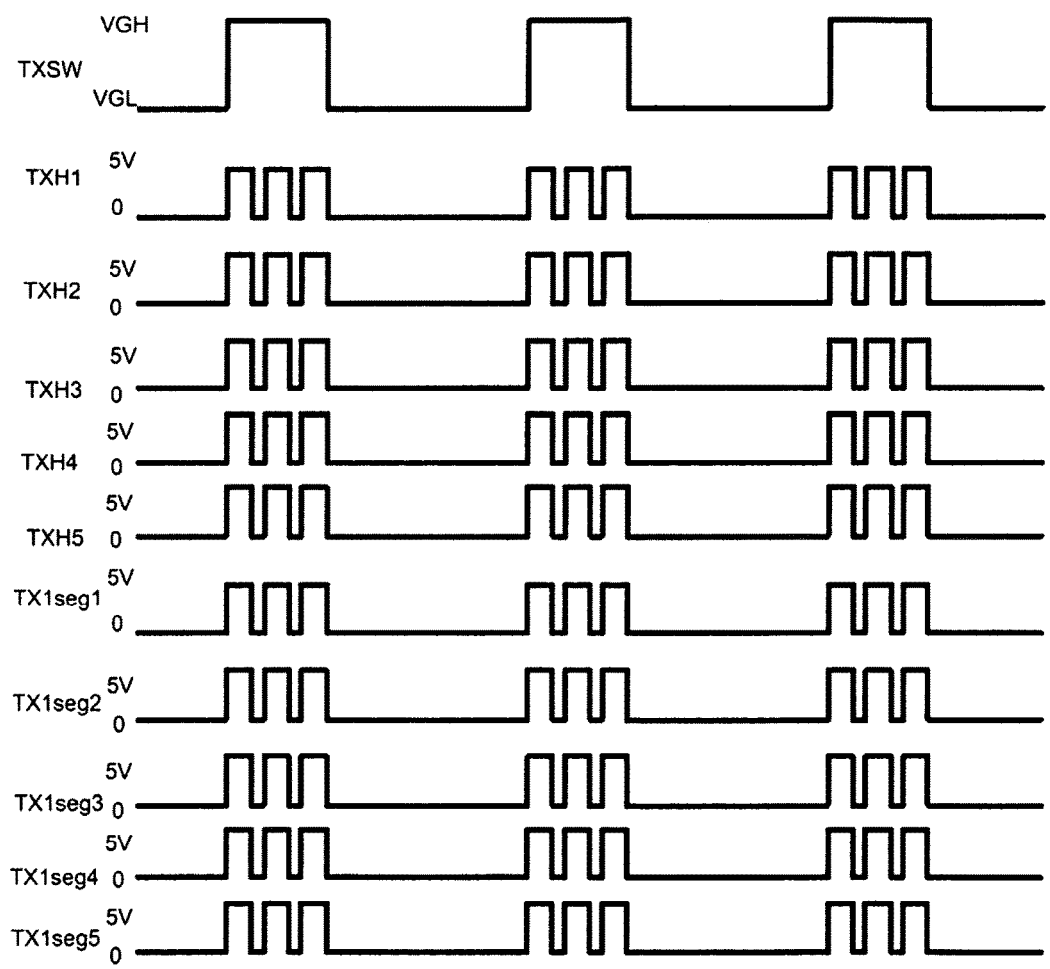
FIG. 17 is a diagram showing waveforms of the selection circuit, according to embodiments of the disclosure.

FIG. 17 is a diagram showing waveforms of the selection circuit, according to embodiments of the disclosure. As shown in FIG. 17, when the signal input terminal and the switch controlling signal terminal are both at a high level, the signal of the terminal TX1seg1 is represented by the signal of the terminal TXH1, the signal of the terminal TX1seg2 is represented by the signal of the terminal TXH2, the signal of the terminal TX1seg3 is represented by the signal of the terminal TXH3, the signal of the terminal TX1seg4 is represented by the signal of the terminal TXH4, and the signal of the terminal TX1seg5 is represented by the signal of the terminal TXH5. It is possible that the selection circuit may include more than five groups of transmission gates.

In a touch sensing phase, the latch scanning circuit is configured to control the selection circuit to connect the touch signal terminal with the touch driving lines, so that touch driving signals are output to the common electrode blocks; while in a display phase, the latch scanning circuit is configured to control the selection circuit to connect the common electrode signal terminal with the touch driving lines, so that display driving signals are output to the common electrode blocks.

In some embodiments, the substrate of the touch display substrate is a TFT glass substrate, the common electrodes are disposed at a display region of the TFT glass substrate, and the vertical shift circuits are disposed at a non-display region of the TFT glass substrate.

It should be noted that the touch display substrate in any of the embodiments mentioned above may further include other parts for normal operations of the touch display substrate in addition to the above-described circuits. The touch display substrate can be applied to a mobile phone, a desktop computer, a laptop, a tablet computer, an electronic album or electronic paper, for example.

In the touch sensing state, when touch driving signals are applied to the touch driving electrodes, the capacitance is formed between the touch driving electrodes and the common electrode and will affect the rotation of liquid crystal molecules. Therefore, in order to avoid the effect of the capacitance on the rotation of the liquid crystal molecules, the display state and the touch sensing state of the touch display substrate operate in a time-division manner in some embodiments.

In embodiments of the disclosure, the vertical shift circuit units are disposed at a non-display region of the glass substrate, and the controlling IC includes an FPC and an IC.

The controlling IC may be an IC disposed at the non-display region of the glass substrate, and the vertical shift circuit units are disposed at the non-display region of the glass substrate between the IC and the common electrode.

It should be noted that, in an in-cell touch display device with the touch display substrate provided in the embodiments, a common wiring for transmitting signals is shared by each column of common electrode blocks due to the introduction of the latch scanning circuit and the selection circuit, so that the number of I/O interfaces required for connecting with the controlling IC is reduced.

As such, each group of common electrode blocks are electrically connected with the controlling IC via only one data interface of the vertical shift circuit unit, that is, only one data interface of the controlling IC is required by each group of common electrode blocks, so that the remaining data interfaces of the controlling IC can be used for other functions or can be eliminated to save space, thereby reducing the width of the flexible printed circuit on glass (FOG).

In embodiments, the touch display substrate includes the vertical shift circuit and the controlling IC, where the vertical shift circuit includes at least two cascaded vertical shift circuit units each electrically connected with a group of common electrode blocks. As compared with the existing design in which each of the common electrode blocks is electrically connected with the controlling IC via in individual wiring and hence the controlling IC is provided with M×N data interfaces (if the common electrode blocks are arranged in an M×N array), the disclosure is advantageous in that each group of common electrode blocks are electrically connecting with the controlling IC via only one data interface. That is, each group of common electrode blocks are electrically connected with only one data interface of the controlling IC via one data interface of the corresponding vertical shift circuit unit. In addition, a plurality of the vertical shift circuit units can further be disposed on the glass substrate, and the controlling IC is disposed on an FPC, thus the number of data interface (such as an I/O interface) leading out from the glass substrate is reduced, the manufacturing cost of the glass substrate remains unchanged, and the number of the data interface of the controlling IC is reduced, thereby significantly reducing the manufacturing cost for the in-cell touch display device.

It should be noted that the embodiments of the disclosure and the technical principles used therein are described as above. It should be appreciated that the disclosure is not limited to the particular embodiments described herein, and any apparent alterations, modification and substitutions can be made without departing from the scope of protection of the disclosure. Accordingly, while the disclosure is described in detail through the above embodiments, the disclosure is not limited to the above embodiments and can further include other additional embodiments without departing from the concept of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:
1. A touch display substrate, comprising:
 a substrate including a display region and a non-display region;
 a plurality of common electrode blocks spaced apart from each other, which are arranged in an M×N array with M rows and N columns, and are operable as touch electrodes, wherein M and N are positive integers;

a plurality of wirings, each of which is electrically connected with a corresponding one of the plurality of common electrode blocks;

a vertical shift circuit arranged in the non-display region and electrically connected with the plurality of wirings, wherein the vertical shift circuit includes a plurality of cascaded vertical shift circuit units, and each of the plurality of vertical shift circuit units is connected with wirings corresponding to a column of common electrode blocks, and is configured to sequentially output touch driving signals to the column of common electrode blocks; and a controlling IC connected with the vertical shift circuit and configured to output a touch driving signal to the vertical shift circuit;

wherein, the plurality of common electrode blocks are divided into n groups of common electrode blocks by columns, and the controlling IC is configured to apply scan pulse signals of different frequencies to different groups of common electrode blocks in each of a plurality of touch scanning time periods, each of the n groups of common electrode blocks receives scan pulse signals of different frequencies from the controlling IC in different touch scanning time periods.

2. The touch display substrate of claim 1, wherein the plurality of common electrode blocks are divided into two equal groups of common electrode blocks by columns; the controlling IC is configured to apply scan pulse signals with a first frequency to a first group of common electrode blocks and apply scan pulse signals with a second frequency to a second group of common electrode blocks in a first touch scanning time period, and apply scan pulse signals with the second frequency to the first group of common electrode blocks and apply scan pulse signals with the first frequency to the second group of common electrode blocks in a second touch scanning time period; the first touch scanning time period alternates with the second touch scanning time period by a preset cycle.

3. The touch display substrate of claim 1, wherein the common electrode blocks divided into three equal groups of common electrode blocks by columns; the controlling IC is configured to apply scan pulse signals with a first frequency to a first group of common electrode blocks, apply scan pulse signals with a second frequency to a second group of common electrode blocks and apply scan pulse signals with a third frequency to a third group of common electrode blocks in a first touch scanning time period; apply scan pulse signals with the second frequency to the first group of common electrode blocks, apply scan pulse signals with the third frequency to the second group of common electrode blocks, and apply scan pulse signal with the first frequency to the third group of common electrode blocks in a second touch scanning time period; and apply scan pulse signals with the third frequency to the first group of common electrode blocks, apply scan pulse signals with the first frequency to the second group of common electrode blocks, and apply scan pulse signal with the second frequency to the third group of common electrode blocks in a third touch scanning time period; the first touch scanning time period, the second scanning time period and the third touch scanning time period alternate with one another by a preset cycle.

4. The touch display substrate of claim 1, wherein the vertical shift circuit unit comprises a latch scanning circuit and a selection circuit, a control terminal of the latch scanning circuit is connected with the controlling IC, a first output terminal of the latch scanning circuit is connected with a selection signal inputting terminal of the selection circuit, and a second output terminal of the latch scanning circuit is connected with a control terminal of a next stage of latch scanning circuit; a signal outputting terminal of the selection circuit is connected with the common electrode block, and the selection circuit further includes a touch signal terminal configured to receive a touch driving signal and a common electrode signal terminal configured to receive a common electrode signal.

5. The touch display substrate of claim 4, wherein the latch scanning circuit comprises a latch, a NAND gate, a buffer and a reset switch, a first input terminal of the latch is connected with the controlling IC, an output terminal of the latch is connected with the an input terminal of the NAND gate, an output terminal of the NAND gate is connected with an input terminal of the buffer, an output terminal of the buffer is connected with a selection signal inputting terminal of the selection circuit, and a second input terminal of the latch is connected with the reset switch.

6. The touch display substrate of claim 4, wherein the latch scanning circuit comprises a first inverter, a second inverter, a third inverter, a fourth inverter, a fifth inverter, a first clock inverter, a second clock inverter, a NAND gate and a P-type thin film transistor; wherein an input terminal of the first inverter is connected with the controlling IC, a second power terminal of the first clock inverter and a first power terminal of the second clock inverter; an input terminal of the first clock inverter is connected with the controlling IC; an output terminal of the first inverter is connected with a first power terminal of the first clock inverter and a second power terminal of the second clock inverter; an output terminal of the first clock inverter is connected with a drain electrode of the P-type thin film transistor, an output terminal of the second clock inverter and an input terminal of the second inverter; an output terminal of the second inverter is connected with an input terminal of the second clock inverter and a second input terminal of the NAND gate; a first input terminal of the NAND gate is connected with the controlling IC; an output terminal of the NAND gate is connected with an input terminal of the third inverter; an output terminal of the third inverter is connected with an input terminal of the fourth inverter; an output terminal of the fourth inverter is connected with an input terminal of the fifth inverter; an output terminal of the fifth inverter is connected with a selection signal inputting terminal of the selection circuit; a gate electrode of the P-type thin film transistor is connected with a reset signal terminal; and a source electrode of the P-type thin film transistor is connected with a voltage signal terminal.

7. The touch display substrate of claim 4, wherein the selection circuit comprises a sixth inverter, a seventh inverter, an eighth inverter, a ninth inverter, a tenth inverter, an eleventh inverter, a twelfth inverter, a thirteenth inverter, a fourteenth inverter, an N-type thin film transistor, a first transmission gate and at least one group of transmission gates, wherein the group of transmission gates comprise a second transmission gate and a third transmission gate; wherein an input terminal of the sixth inverter is connected with a selection signal inputting terminal of the selection circuit and an input terminal of the first transmission gate; an output terminal of the sixth inverter is connected with a gate electrode of the N-type thin film transistor and an output terminal of the first transmission gate; a second power terminal of the first transmission gate is connected with a switch controlling signal terminal; a drain electrode of the N-type thin film transistor is connected with a voltage signal terminal; a first power terminal of the first transmission gate is connected with an input terminal of the seventh inverter, an input terminal of the eleventh inverter and a source electrode of the N-type thin film transistor; an output terminal of the seventh inverter is connected with an input terminal of the eighth inverter and an input terminal of the tenth inverter; an output terminal of the eighth inverter is connected with an input terminal of the ninth inverter; an output terminal of the tenth inverter is connected with an input terminal of the second transmission gate; an output terminal of the ninth inverter is connected with an output terminal of the second transmission gate; an output terminal of the eleventh inverter is connected with an input terminal of the twelfth inverter and an input terminal of the fourteenth inverter; an output terminal of the twelfth inverter is connected with an input terminal of the thirteenth inverter; an output terminal of the thirteenth inverter is connected with an input terminal of the third transmission gate included in the same group of transmission gates as the second transmission gate; an output terminal of the fourteenth inverter is connected with an output terminal of the third transmission gate; and a second power terminal of the second transmission gate is connected with a first power terminal of the third transmission gate.

8. The touch display substrate of claim 4, wherein the selection circuit comprises a sixth inverter, a seventh inverter, an eighth inverter, a ninth inverter, a tenth inverter, an eleventh inverter, a twelfth inverter, a thirteenth inverter, a fourteenth inverter, an N-type thin film transistor, a first transmission gate, a fourth transmission gate, a fifth transmission gate, a sixth transmission gate, a seventh transmission gate, an eighth transmission gate, a ninth transmission gate, a tenth transmission gate, an eleventh transmission gate, a twelfth transmission gate and a thirteenth transmission gate;

wherein an input terminal of the sixth inverter is connected with a selection signal inputting terminal of the selection circuit and an input terminal of the first transmission gate; an output terminal of the sixth inverter is connected with a gate electrode of the N-type thin film transistor and an output terminal of the first transmission gate; a second power terminal of the first transmission gate is connected with a switch controlling signal terminal; a drain electrode of the N-type thin film transistor is connected with a voltage signal terminal; a first power terminal of the first transmission gate is connected with an input terminal of the seventh inverter, an input terminal of the eleventh inverter and a source electrode of the N-type thin film transistor; an output terminal of the seventh inverter is connected with an input terminal of the eighth inverter and an input terminal of the tenth inverter; an output terminal of the eighth inverter is connected with an input terminal of the ninth inverter; an output terminal of the tenth inverter is connected with an input terminal of the fourth transmission gate, an input terminal of the sixth transmission gate, an input terminal of the eighth transmission gate, an input terminal of the tenth transmission gate and an input terminal of the twelfth transmission gate; an output terminal of the ninth inverter is connected with an output terminal of the fourth transmission gate, an output terminal of the sixth transmission gate, an output terminal of the eighth transmission gate, an output terminal of the tenth transmission gate, and an output terminal of the twelfth transmission gate; an output terminal of the eleventh inverter is connected with an input terminal of the twelfth inverter and an input terminal of the fourteenth inverter; an output terminal of the twelfth inverter is connected with an input terminal of the thirteenth inverter; an output terminal of the thirteenth inverter is connected with an input terminal of the fifth transmission gate, an input terminal of the seventh transmission gate, an input terminal of the ninth transmission gate, an input terminal of the eleventh transmission gate and an input terminal of the thirteenth transmission gate; an output terminal of the fourteenth inverter is connected with an output terminal of the fifth transmission gate, an output terminal of the seventh transmission gate, an output terminal of the ninth transmission gate, an output terminal of the eleventh transmission gate and an output terminal of the thirteenth transmission gate; a second power terminal of the fourth transmission gate is connected with a first power terminal of the fifth transmission gate; a second power terminal of the sixth transmission gate is connected with a first power terminal of the seventh transmission gate; a second power terminal of the eighth transmission gate is connected with a first power terminal of the ninth transmission gate; a second power terminal of the tenth transmission gate is connected with a first power terminal of the eleventh transmission gate; and a second power terminal of the twelfth transmission gate is connected with a first power terminal of the thirteenth transmission gate.

9. The touch display substrate of claim 4, wherein in a touch sensing phase, the latch scanning circuit is configured to control the selection circuit to connect the touch signal terminal with the touch driving lines, so that touch driving signals are output to the common electrode blocks; while in a display phase, the latch scanning circuit is configured to control the selection circuit to connect the common electrode signal terminal with the touch driving lines, so that display driving signals are output to the common electrode blocks.

10. The touch display substrate of claim 4, wherein the substrate is a TFT glass substrate, the common electrode is disposed at a display region of the TFT glass substrate, and the vertical shift circuit is disposed at a non-display region of the TFT glass substrate.

* * * * *